(12) United States Patent
Peterson

(10) Patent No.: US 8,400,451 B2
(45) Date of Patent: *Mar. 19, 2013

(54) CLOSE-PACKED, UNIFORMLY ADJACENT MULTIRESOLUTIONAL, OVERLAPPING SPATIAL DATA ORDERING

(76) Inventor: Perry Peterson, Kingston (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/230,338

(22) Filed: Sep. 12, 2011

(65) Prior Publication Data

US 2012/0001915 A1    Jan. 5, 2012

Related U.S. Application Data

(63) Continuation of application No. 10/552,901, filed as application No. PCT/CA2004/001507 on Jul. 26, 2004, now Pat. No. 8,018,458.

(51) Int. Cl.
*G06T 17/00* (2006.01)
(52) U.S. Cl. ......... 345/428; 345/418; 345/581; 345/582
(58) Field of Classification Search .......... 345/418, 345/428, 698, 699; 703/2; 707/3, 5, 6, 100, 707/101
See application file for complete search history.

(56) References Cited

U.S. PATENT DOCUMENTS

| | | | |
|---|---|---|---|
| 3,953,948 A | 5/1976 | Hogan | |
| 4,691,291 A | 9/1987 | Wolfram | |
| 4,809,202 A | 2/1989 | Wolfram | |
| 5,631,970 A | 5/1997 | Hsu | |
| 5,675,720 A | 10/1997 | Sato et al. | |
| 5,781,195 A | 7/1998 | Marvin | |
| 5,848,404 A | 12/1998 | Hafner et al. | |
| 5,999,187 A * | 12/1999 | Dehmlow et al. | 345/420 |
| 6,308,177 B1 | 10/2001 | Israni et al. | |
| 6,384,826 B1 | 5/2002 | Bern et al. | |
| 6,414,683 B1 | 7/2002 | Gueziec | |
| 6,828,966 B1 * | 12/2004 | Gavriliu et al. | 345/420 |
| 7,225,207 B1 * | 5/2007 | Ohazama et al. | 1/1 |
| 8,018,458 B2 | 9/2011 | Peterson | |
| 2002/0069018 A1 | 6/2002 | Brueckner et al. | |
| 2003/0112281 A1 | 6/2003 | Sriram et al. | |
| 2003/0227455 A1 | 12/2003 | Lake et al. | |
| 2004/0225665 A1 | 11/2004 | Toyama et al. | |
| 2005/0143919 A1 * | 6/2005 | Williams | 702/1 |
| 2005/0193365 A1 | 9/2005 | Sahr | |
| 2005/0223337 A1 * | 10/2005 | Wheeler et al. | 715/806 |

FOREIGN PATENT DOCUMENTS

CA    2436312    2/2005

OTHER PUBLICATIONS

Lee Middleton et al., Framework for practical hexagonal-image, Jan. 2002, Journal of electric Imaging, vol. 11(1), pp. 104-112.*
Kevin Sahr et al, Discrete Global Grid Systems 1998, Computing Science and Statistics, 30 ed., pp. 1-10.*
Dan Carr et al., ISEA Discrete Global Grids, 1997, Graphics Newsletter, vol. 8, No. 2/3,, pp. 31-39.*

(Continued)

*Primary Examiner* — Said Broome
*Assistant Examiner* — Abderrahim Merouan
(74) *Attorney, Agent, or Firm* — Bereskin & Parr LLP/S.E.N.C.R.L., s.r.l.

(57) ABSTRACT

A method, apparatus, system and data structure is disclosed for mapping of spatial data to linear indexing for efficient computational storage, retrieval, integration, transmission, visual display, analysis, fusion, and modeling. These inventions are based on space being decomposed into uniform discrete closely packed (hexagonal) cell areas (85). Each resolution of close-packed cells can be further divided into incongruent but denser clusters of close-packed cells. The spatial indexing (86) is applied in such a manner as to build a relationship with the spatially close cells of any resolution.

20 Claims, 11 Drawing Sheets

OTHER PUBLICATIONS

Carr et al.: "Topics in Information Visualization: ISEA Discrete Global Grids". Statistical Computing & Statistical Graphics Newsletter, vol. 8, No. 2/3, Winter 1997, pp. 31-39. Available online at http://stat-computing.org/newsletter/issues/scgn-08-2.pdf.

Kimerling, John: "Discrete Global Grids". (May 8, 2002). Available online at http://dusk2.geo.orst.edu/buffgis/dr_k.html.

Ramsak F et al.: "Interactive ROLAP on large datasets: a case study with UB-Trees". Database Engineering & Applications, 2001 International Symposium on. Jul. 16-18, 2001. Piscataway, NJ, USA, IEEE, Jul. 16, 2001, pp. 167-176, XPO10554379 ISBN:978-0-7695-1140-5.

Gaede V et al.: "Multidimensional Access Methods". ACM Computing Surveys, ACM, New York, NY, USA, vol. 30, No. 2, Jun. 1, 1998, pp. 170-231, XP002950372 ISSN: 0360-0300.

Pappus D'Alexandrie: "Preface on the Sagacity of Bees", La Collection Mathematique, Librairie Scientifique et Technique, Paris, 1933, pp. 237-329.

Panu, U.S., et al.: "Runoff Hydrographs by the Hexagon Grid Method". Processings of the CSCE Annual Conference, vol. V, pp. 341-358, 1990.

Russell, J.: "Spatial Data and the Voronoi Tessellation". Jul. 22, 2001, (URL:http://www.ddj.com/184408891), Dr. Dobb's Journal, Copyright 1992.

Gibson, L. et al.: "Spatial Data Processing Using Generalized Balanced Ternary". Interactive Systems Corporation, Littleton, Colorado, 82CH1761-6/82/0000/566$00.75 Copyright 1982, IEEE, pp. 566-571.

Von Koch, Helge.: "Une Methode Geometrique Elementaire Pour L'etude De Certaines Questions De La Theorie des Courbes Planes". Acta Mathematics, 30, Imprine le Oct. 17, 1905, pp. 145-174. http://mathworld.wolfram.com/kochSnowflake.html.

Article entitled: "3-Subdivision" by Leif Kobbelt, published by Max-Planck Insitute for Computer Sciences, Germany, http://www-i8.infomatik.rwth-aachen.de/publications.downloads/sqrt.3.pdf, SIGGRAPH 2000:103-112, 2001.

Article entitled: "An Equal-Area Map Projection for Polyhedral Globes" by John P. Snyder, United States Geological Survey/Reston, Virginia, United States, Cartographica vol. 29, No. 1 Spring 1992 pp. 10-21.

Article entitled:"Discrete Global Grid Systems" by Sahr, K. et al. (published in :(1998) Computing Science and Statistics, 30 ed. S. Weisberg, Interface Foundation of North America, Inc. Fairfax Station, VA.) http://bufo.geo.orst.edu/tc/firma/gg/pubs/gdggs98.pdf.

Article entitled: "Encoding and Handling Geospatial Data with Hierarchical Triangular Meshes", In Kraak, M.J. and Molenarr, M. (eds) Advances in GIs Researh II, London: Taylor & Francis, pp. 505-518, 1996 by Geoffrey Dutton, Dept. of Geography, Univ. of Zurich, Switzerland, http://www.spatial-effects.com/SE-papers1.html#SDH96.

Kimerling, Jon Dr. "Discrete Global Grids", May 8, 2002, (www.ncgia:ucsb.edu/globalgrids-book/) and projects by colleague Denis White at the EPA.

Article entitled: "Geodesic Discrete Global Grid Systems" by Sahr, K. et al. Cartography and Geographic Information Science, vol. 30, No. 2, 2003, pp. 121-134, 2003, http://www.sou.edu/ca/sahr/dgg/pubs/gdggs03.pdf.

Article entitled: "Hexagonal Image Processing"—A practical apprach—Series: Advances in Pattern Recognation, Springer, 2005 by Middleton, L. et al.

Article entitled: "ISEA Discrete Global Grids" by Carr, D. et al., Statistical Computing & Statistical Graphics Newsletter, vol. 8, No. 2/3, pp. 31-39, 1998. http://www.galaxy.gmu.edu/-dcarr/lib/v8n2.pdf.

Article entitled: "Lattice-Gas Automata for the Navier-Stokes Equation", by Frisch, U. et al. Physical Review Letters, vol. 56, No. 14, Apr. 7, 1986, pp. 1505-1508.

"On the Division of Space with Minimum Partitional Area" by Thomson, W. et al. The London, Edinburgh, and Dublin Philosophical Magazine and Journal of Science, vol. XXIV-Fifth Series. Jul.-Dec. 1887, pp. 503-514.

Hipparchus Tutorial and Programmer's Guide, Internet Edition (Corresponding to Hipparchus Release 3.4), last updated Feb. 27, 2007, by Ron Gilmore, Vice President and John Russell, President, Geodyssey Limited, Calgary (Alberta), Canada, copyright Geodyssey Limited, 1993-2004. http://www.geodyssey.com/tutorial/tc00html; Chapter 6: Working with Voronoi Cells. International Search Report.

\* cited by examiner

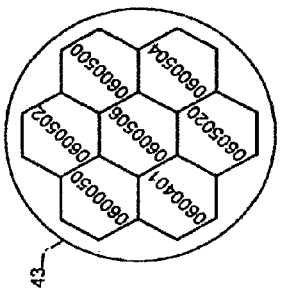
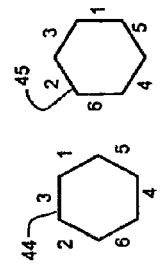
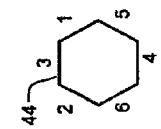
FIG. 7

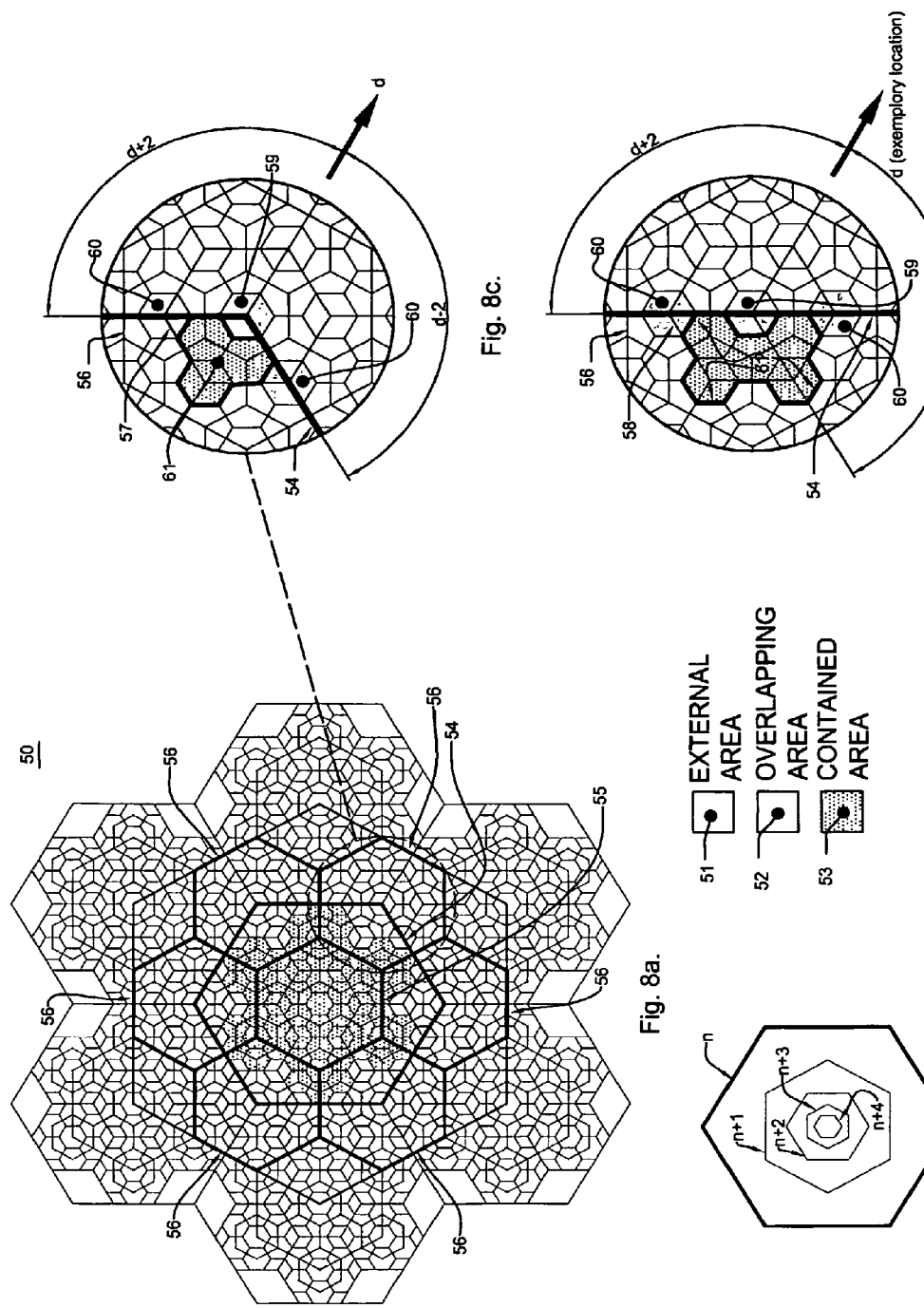

CLOSE-PACKED, UNIFORMLY ADJACENT MULTIRESOLUTIONAL, OVERLAPPING SPATIAL DATA ORDERING

This application is a continuation of application Ser. No. 10/552,901, filed Jul. 26, 2006, which is the U.S. national phase entry of PCT Application No. PCT/CA2004/001507, filed Jul. 26, 2004, which claims priority from Canadian Application no. 2,436,312, filed Aug. 1, 2003.

BACKGROUND OF THE INVENTION

1. Field of the Invention

The invention refers generally to methods and digital information systems that represent visual images of planar or near planar space. More particularly, the methods and systems pertain to images that are referenced to earth.

REFERENCES

| | | | |
|---|---|---|---|
| U.S. Pat. No.: 4,691,291 | September, 1987 | Wolfram | 364/717. |
| U.S. Pat. No.: 4,809,202 | February, 1989 | Wolfram | 364/578. |

Dutton, G., 1990, "Locational Properties of Quaternary Triangular Meshes", *Proceedings of the Spatial Data Handling Symposium*, Dept. of Geography, U. of ZSurich, July 1990, p. 901-910.

Gibson, Laurie and Dean Lucas, "Spatial Data Processing Using Generalized Balanced Ternary", *Proceedings of the IEEE Computer Society Conference on Pattern Recognition and Image Processing*, June 1982, p. 566-571

Koch, Niels Fabian Helge von, Une methode geometrique elementaire pour l'etude de certaines questions de la theorie des courbes plane, 1904

Panu, U. S. and P. R. Peterson (1990): "Runoff Hydrographs by Hexagon Gird Method" *Proceedings of the CSCE Annual Conference*, Vol. V, pages 341-358.

Sahr, Kevin and Denis White, "Discrete Global Grid Systems", *Computing Science and Statistics*, 30, ed. S. Weisberg, Interface Foundation of North America, Inc., Farfax Station, Va. 1998

Snyder, J. P. (1992). "An equal-area map projection for polyhedral globes." *Cartographica* 29(1): 10-21.

2. Description of Prior Art

Storing Images as Discrete Grids

A common method of representing spatial information in a digital device is the division of space into a tessellation of discrete cells. Examples include raster images and pixel based visual devices. Raster images are visual references to data in the form of "dots"-typically arranged in an array of rows and columns, along with an attribute of that dot-usually a number representing a sensor's spectral value.

Vector images are interpretations of spatial features using geometric shapes described mathematically with coordinates. Identification of point locations, the basic unit of vector mathematics, is often based on the rectangular Cartesian grid.

Regular rectangular grids are commonly used due to their immediate transformation into simplified matrix or array operations, their compatibility with well-understood planar Euclidean geometry, and the prevalence of cardinal directions in memetic spatial thought.

Systems that Utilize Spatial Data Representation

A Geographic Information System [GIS] is a computer application that provides for the creation, storage, visualization and analysis of georeferenced spatial information. A GIS can be raster or vector based. In a GIS, spatial references are made to geographic locations on the earth surface. This reference location is further enhanced with descriptive information regarding the feature or area it represents. Georeferenced spatial information encompasses elements familiar to those using paper maps—such as roads and contours and place names, but also includes any data with a physical location description-like street addresses, cadastral boundaries and geographic coordinates and can include space and airborne imagery. Almost all data can contain geospatial elements.

Some Geographic Information Systems incorporate 3-dimensions with a Digital Elevation Model, a specialized form of geospatial vector data that describes the 3-dimensions of a terrain and heights on features. A Discrete Global Grid System is a type of GIS that provides a tessellation of uniform cells placed over the earth as a reference to location and area of influence.

Hexagonal Grids

Hexagonal cells are documented as the preferred shape for many gridding applications. A hexagonal grid is the most efficient method of dividing planar space into regions of equal area with the least total perimeter. For a given distance between the center of a polygon and its farthest perimeter points, the hexagon has the largest area of the three possible uniform cell grids, rectangle, triangle and hexagon. The hexagonal grid provides a symmetric cell structure such that all adjacent cells are equidistant to 6 edge neighbours. Hexagons provide the peak efficiency for spatial data storage. Hexagon lattices have been shown to provide excellent modeling characteristics.

Indexing systems have been proposed for transposing spatial imagery on hexagon grids, notably Generalized Balanced Ternary of Gibson and Lucas. Hexagons can be used to define geographic location. Sahr, et. al. proposed a Discrete Global Grid System called the Icosahedron Snyder Equal Area Aperture 3 Hexagon Grid as an alternative to rectangular graticule of latitudes and longitudes based on a projection from the icosahedron to the spheroid proposed by John Snyder.

Hexagonal grids have been overlooked in many applications due to their nonconformance, by definition, to rectangular gridding and the utility of accompanying rectangular mathematics. Hexagonal Grids have presented an inability to aggregate completely into larger, or disaggregate completely into smaller, self-similar cells in hierarchal B-Tree divisions such as the rectangular Quad Tree or sub-forms, such as the Quaternary Triangular Mesh, proposed by Geoffrey Dutton.

Addressing with Hierarchal Indices

On-Line Analytical Processing is a term used to define systems that promote fast analysis of shared multidimensional information. Prior art, in the development of relational and spatial database, place heavy reliance on balanced hierarchal indexing for efficient data search and retrieval. In regular graticulation, the division of the earth surface in latitudes and longitudinal angles, hierarchies are not apparent nor are the resulting cells of equal area or shape.

Spatial Transformations

Spatial analysis, data fusion and modeling represent sophistication in information systems classified as transformations. In a GIS, spatial analysis is generally based on ideas of proximity, networks and neighbours along with standard data analysis techniques such as correlative analysis. Analytical transforms tend to cut the data in several ways to facilitate interpretation.

Data fusion has many definitions. Generally, it can be held to mean the creation or enhancement of georeferenced attributes based on the combination of two or more attributes.

An example would be the use of high-resolution panchromatic satellite imagery to enhance the values of low-resolution hyper-spectral satellite imagery.

Spatial modeling provides a means of predicting outcomes based on known behaviors and the presence of specified factors. Modeling uses known behaviors to extrapolate or simulate possible outcomes. Finite difference methods can utilize standardized meshes to route partial differential equations to predict weather patterns. Cellular automata require simple rules and cell boundaries to predict future behaviors and patterns as demonstrated by John Conway in his cellular automata discovery: "the game of life". A practical use the hexagon grid as a framework to complete environmental systems modeling is introduced by U.S. Panu in a semi-deterministic hexagonal based runoff model.

Stephen Wolfram has shown the successful use of hexagonal meshes for using cellular automata to simulate systems described by partial differential equations such as those that describe the flow of fluid, diffusion or heat transfer.

On Demand on-Line Data Transmission

Information systems are ideally utilized when the data is available to the maximum number of users. Earth observation systems proliferate global data sets. On-line on-demand data systems that promote file sharing can be used in a spatial data environment. Means of storage, retrieval, searching and finding the data is necessary to maximize data utility. Peer-to-peer file sharing and data discovery applications are well known in prior art. Such systems require a client to search repositories of data describing the address of server and content of data files. When the search criteria are met, the address of the server where the data is stored is returned.

Since these data sets can be large, development of data compression, peer-to-peer, and streaming data file sharing and grid computing applications that provide opportunities for efficient file transfer and shared processing are beneficial. Progressive transmission and continuous transmission are useful ways of selectively transmitting data.

Current Situation and Present Need

The planet earth is a dynamic sphere containing interrelationships of environmental systems: an arrangement of geophysical, meteorological and biological activity. Within these natural systems, we create divisions of human interest: artificial boundaries of geopolitical, functional or demographic areas, and natural boundaries such as watersheds or resource delineations. Also, human assets or infrastructure like roads, buildings, sewers and landfill sites, serve as detailed areas of interest within human biological habitat.

Many areas of spatial understanding such as epidemiology, resource management and biodiversity would improve with the availability of detailed geospatial data at multiple resolutions coupled with the behavioral understandings of stochastic methods to provide semi-deterministic modeling.

As space, airborne and ground-based sensors increase in number and sophistication; there is a rapid, and potentially unlimited, growth of global information characterizing these environmental systems. The GIS-centric approach to geospatial data and applications as a paradigm of static well defined spatial data is being eclipsed by these realities and the current operational needs of many spatial data users. A re-conceptualization of the way geo-spatial information is processed toward a general case where all geo-spatial is dynamic and real-time will necessitate a corresponding effective and practical way of handling these diverse and increasingly large, spatial data sets.

Typically Geographic Information Systems reference data to flat maps by projecting geographic coordinates to a regular rectangular grid. The distortion that results from referencing the geodesic sphere onto a projected regular grid map, like the Mercator Projection, is a characteristic that school children are familiar with. A similar condition produces significant difficulties in global geospatial data storage. Traditional geographic coordinate systems, latitude and longitude, do not form uniform cells and therefore are not idealized for use where uniformity of cells is assumed or is beneficial.

Merging geospatial information of disparate sources, accuracies, precisions, and formats is complex. Unlike textual or fielded data, spatial temporal data requires a common spatial reference and significant background or meta-data to facilitate cut and paste, overlay and mosaic operations. Solving the problem of integrating data requires an idealized common reference model. As raster, vector and digital elevation models rely on a regular grid, a standard reference grid would serve as a framework for the compilation and enhancement of all geospatial information.

To access global data, an idealized model of the earth would best approximate it, as it is, an irregular spheroid. This idealized model would allow characteristics of the earth at any point in time and at any location to be observed. An infinite resolution of uniform discrete cells provides a mechanism to build such a data model. A digital version of the globe as a visualization application could show the world in a space view and, as the user rotates the globe and zooms in to a specific point of interest, the spatial data that it represents would confer the curvature of the surface onto the computer monitor in increasing detail.

SUMMARY OF THE INVENTION

It is therefore an object of the invention to provide for an efficient method of mapping two-dimensional spatially organized data to the one-dimensional linear space of a computer storage medium. This object is solved by a method according to claim 1 and a discrete global grid system according to claim 7, claims 2 to 6 refer to specifically preferred realizations of the inventive method, claims 8 to 21 refer to specific advantageous realizations of the discrete global grid system according to claim 7, whereas by the features of claim 14 especially a spatial data retrieval system can be realized, by the features of claim 15 a digital globe visualization system can be realized, by the features of claim 16 an online spatial data discovery and file sharing tool can be realized, by features of claim 17 a spatial data browser can be realized, by the features of claim 18 a spatial data analyzer can be realized and by the features of claim 19 a geospatial model building system can be realized.

The invention realizes an efficient method of mapping two-dimensional spatially organized data to the one-dimensional linear space of a computer storage medium using an assignment of spatial attributes to a cellular tessellation. A linear indexing provides a hierarchical data structure for closely packed, uniformly adjacent, multiresolutional, overlapping cells. The method promotes the hexagonal grid as a practical alternative to rectangular or triangular grid use in a digital computer environment.

According to one aspect of the invention is a method for storing two-dimensional spatially organized data in one-dimensional space on a computer storage medium by mapping the attributes of continuous state planar space to a multi-resolutional tessellation of closely packed uniform cells, each cell being uniquely identified with a sequential number whereas the number includes the identification of a parent cell, the parent cell encompassing a cluster of child cells in a spatial hierarchy of specific order thereby identification of neighbour cells and child cells comprising the requirements:

Req. 1. Spatial attributes are assigned to a parent cell, whose centroid represents its location and the voronoi region created by the boundary with adjacent parent centroids forming the closed area for which the properties of the cell are represented;

Req. 2. A parent cell for which the centroid location is not a centroid location for any lower resolution cells defines the location of a single new child cell of the next highest resolution; alternatively, Req. 3. A parent cell for which its centroid location is also a centroid location for any lower resolution cells defines the location of a single new child cell of the next highest resolution and multiple new child cells of the next highest resolution, one located at each of the vertices of the parent's boundary edge.

Whereby during initial conditions, a parent cell will be assigned a general hexagon shape or the shape of the plane for which it represents, with a starting centroid location that can be considered the planar origin.

Embodiments of the invention include an on-line Discrete Global Grid System featuring hexagonally gridded data for efficient computational storage, retrieval, integration, transmission, visual display, analysis, fusion, and modeling.

BRIEF DESCRIPTION OF THE DRAWINGS

FIG. 7—TRANSLATIONAL MOVEMENT AND ADDITION ON PYXIS PLANE—illustrates an exemplary procedure with addition table for identifying nearest neighbour cells and other such operations on the PYXIS plane.

FIG. 8—BOOLEAN OPERATIVES ON PYXIS PLANE—illustrates an exemplary procedure for identifying a PYXIS point as spatial contained, overlapping or excluded, from a specific cell area. Figures included are FIG. 8a—PYXIS Plane FIG. 8b—Successive Cell Resolutions, FIG. 8c.—Resolution Dependent Conditions within Overlapping Area on Vertex—Condition 2.1, FIG. 8d.—Resolution Dependent Conditions within Overlapping Area on Edge—Condition 2.2.

DETAILED DESCRIPTION OF THE PREFERRED EMBODIMENT

Apparatus and Operating Environment

Figure 1:
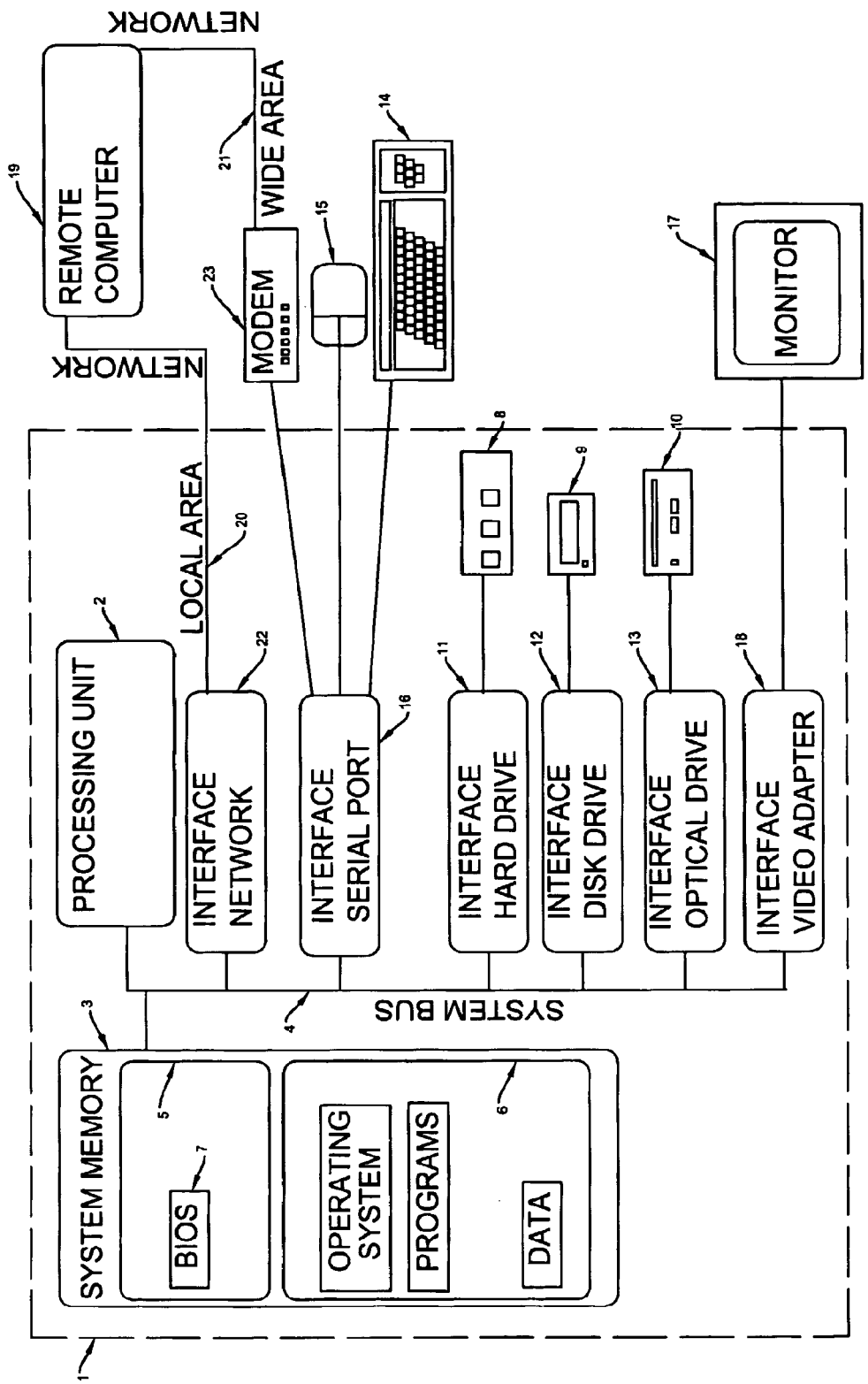
FIG. 1—TYPICAL COMPUTER HARDWARE FOR PYXIS OPERATION—illustrates an apparatus and operating environment in conjunction with which embodiments of the invention may be practiced.

FIG. 1 is a diagram of the apparatus and operating environment in conjunction with which embodiments of the invention may be practiced. The description of FIG. 1 is intended to provide a brief, general description of suitable computer apparatus in conjunction with which the invention may be implemented. The computer, in conjunction with which embodiments of the invention may be practiced, may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Although not required, the invention is described in the general context of computer-executable instructions being executed by a computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer (1), including a processing unit (2), a system memory (3), and a system bus (4) that operatively couples various system components, including the system memory (3), to the processing unit (2). There may be only one or there may be more than one processing unit (2).

The system bus (4) may be any of several types of bus structures including a memory bus or memory controller, a peripheral bus, and a local bus using any of a variety of bus architectures. The system memory (3) includes read only memory (5) and random access memory (6). A basic input/output system (BIOS) (7), containing the basic routines that help to transfer information between elements within the computer (1), such as during start-up, is stored in random access memory (6). The computer (1) further includes a hard disk drive (8), a magnetic disk drive (9) and an optical disk drive (10), as memory storage devices.

The hard disk drive (8), magnetic disk drive (9), and optical disk drive (10) are connected to the system bus (4) by a hard disk drive interface (11), a magnetic disk drive interface (12), and an optical disk drive interface (13), respectively. The drives and their associated computer-readable media provide nonvolatile storage of computer-readable instructions, data structures, program modules and other data for the computer (1). It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A user may enter commands and information into the personal computer (1) through input devices such as a keyboard (14) and mouse (15). Other input devices (not shown) may include a microphone, joystick, game pad, satellite dish, scanner, or the like. These and other input devices are often connected to the processing unit (2) through a serial port interface (16) that is coupled to the system bus, but may be connected by other interfaces, such as a parallel port, game port, or a universal serial bus (USB). A monitor (17) or other type of display device is also connected to the system bus (4) via an interface, such as a video adapter (18). In addition to the monitor, computers typically include other peripheral output devices (not shown), such as speakers and printers.

The computer (1) may operate in a networked environment using logical connections to one or more remote computers, such as remote computer (19). A communication device coupled to or a part of the computer (1) achieves these logical connections; the invention is not limited to a particular type of communications device. The remote computer (19) may be another computer, a server, a router, a network PC, a client, a peer device or other common network node, and typically includes many or all of the elements described above relative to the computer 1. The logical connections depicted in FIG. 1 include a local-area network (LAN) (20) and a wide-area network (WAN) (21). Such networking environments are commonplace in office networks, enterprise-wide computer networks, intranets and the Internet, which are all types of networks.

When used in a LAN-networking environment, the computer (1) is connected to the local network (20) through a network interface or adapter (22), which is one type of communications device. When used in a WAN-networking environment, the computer 1 typically includes a modem (23), a type of communications device, or any other type of communications device for establishing communications over the wide area network (21), such as the Internet. The modem (23) is connected to the system bus (4) via the serial port interface (16). In a networked environment, program modules depicted relative to the personal computer (1), or portions thereof, may be stored in the remote memory storage device. It is appreciated that the network connections shown are exemplary and other means of and communications devices for establishing a communications link between the computers may be used.

Figure 2:
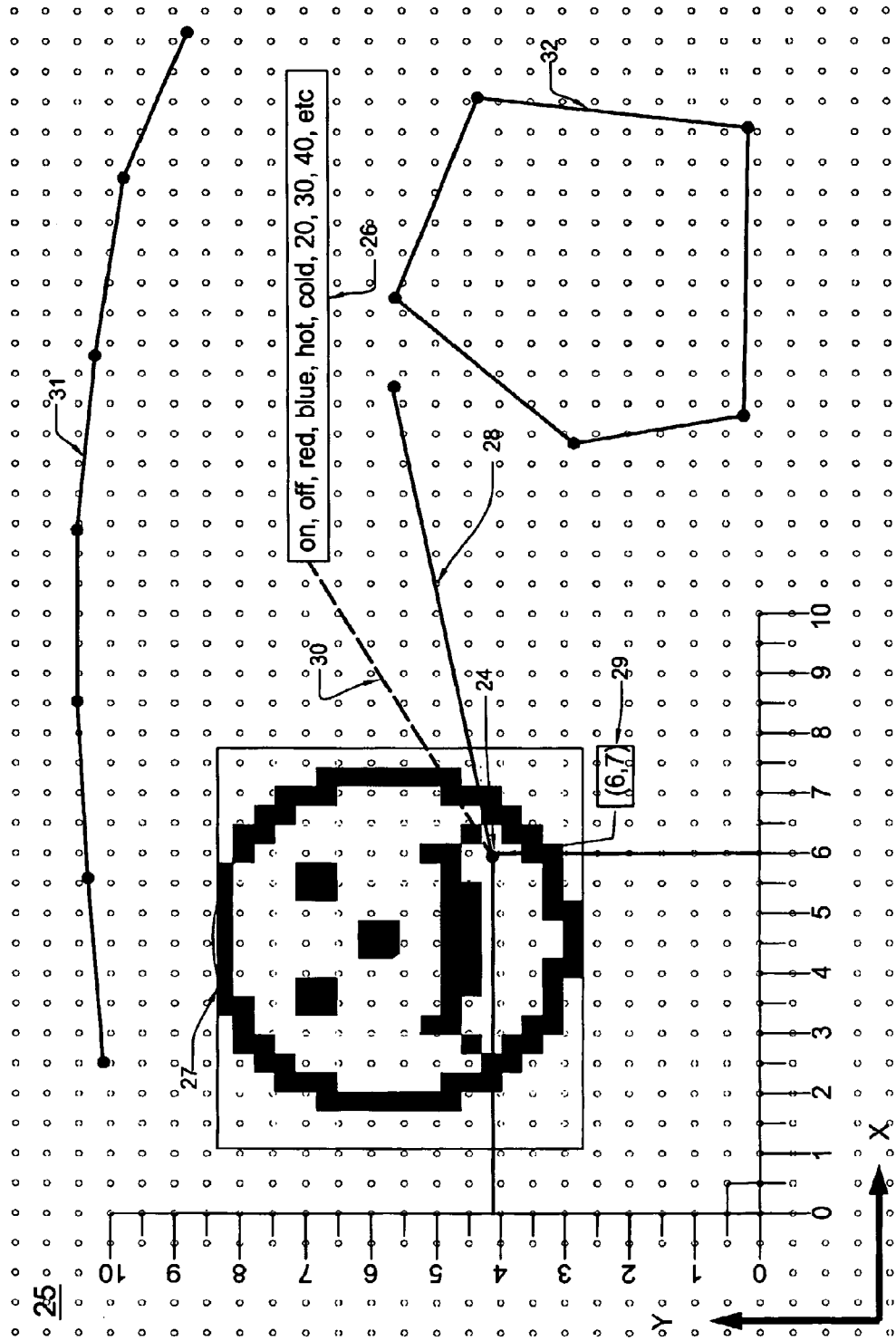
FIG. 2—PRIOR ART FORM OF SPATIAL DATA ON A RECTANGULAR PLANE—illustrates prior art methods of locating spatial information on a rectangular grid.

A Method to Structure Spatial Data in the Form of a Linear Index Division of Space FIG. 2 illustrates prior art methodology for locating spatial information on a rectangular grid. A single spatial coordinate, Point (24), from a defined rectangular Plane (25), with Attributes (26), such as on, of red, blue, hot, cold, 20, 30, 40, etc, shown. Point (24) and Attributes (26) have been created, collected or recorded by any of a number of analog and/or digital methods. Point (24) can be representative of any single dot or a singular dot within a large group of a Raster Image (27) located with a row and column. Alternatively, Point (24) could be a point of a mathematically defined Vector Line (28) located with a Coordinate (6,7) (29) and an index Link (30) to Attributes (26). Exemplary linear and area constructs of the point include a Network (31) and Polygon (32).

Point (24), by its nature, also represents a centroid and a cell area that encompasses a distance between it and the next adjacent point or, on the basis of known practice within geometry and other mathematics, Point (24) is bound by its accuracy, error and precision based on factors of its creation and record. It is exemplary that within this cell area, Attributes (26) can be considered homogenous. For the purpose of this description, the area, whether implied explicitly or implicitly, will be referred to as a point's area of influence.

Figure 3:
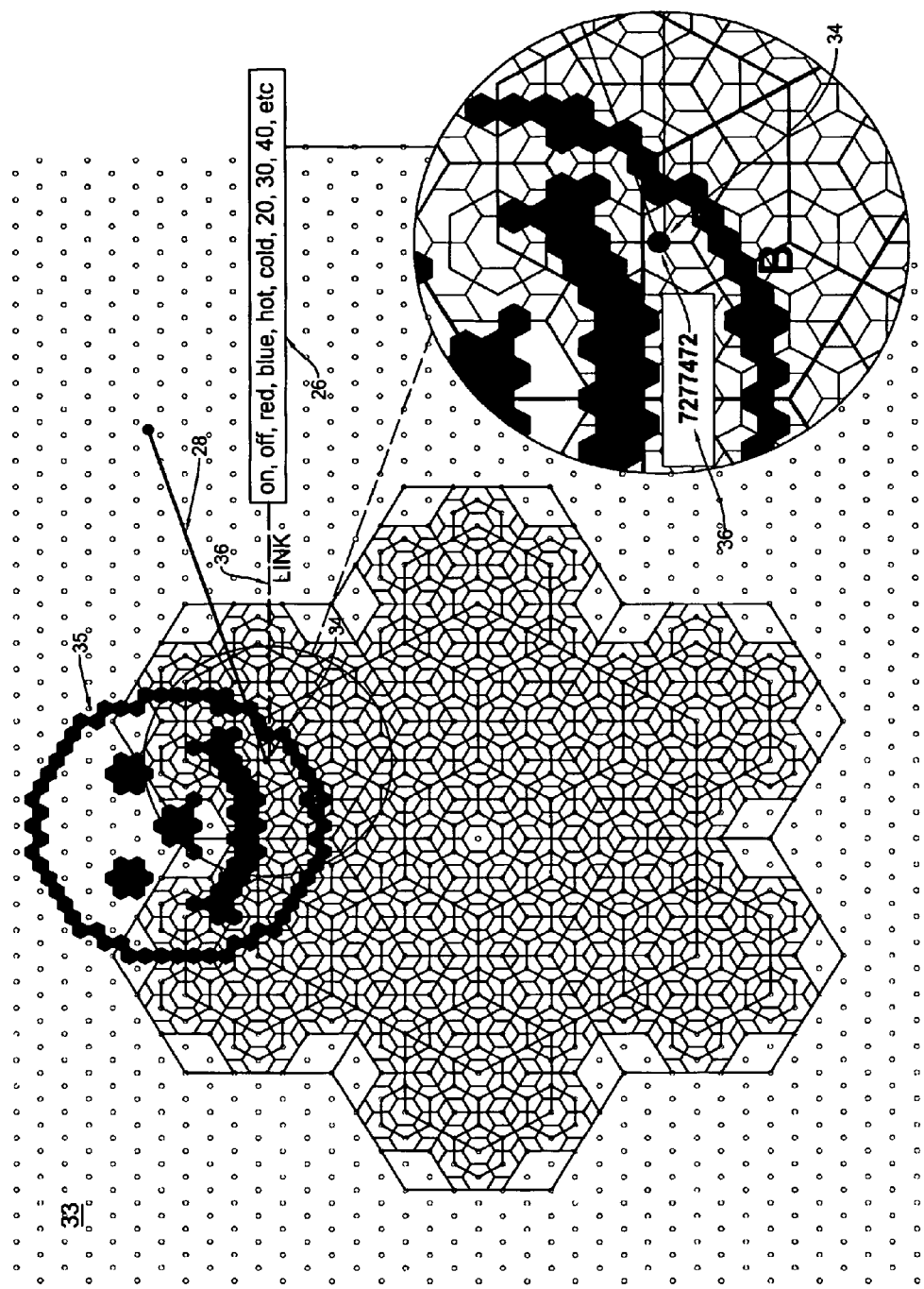
FIG. 3—SPATIAL DATA ON A PYXIS HEXAGON PLANE—Illustrates an alternative planar location scheme called the PYXIS plane whereas the points are closely packed.

FIG. 3 illustrates an alternative planar location scheme whereas the points are closely packed. Referring to FIG. 3, the single spatial Coordinate (29) of Point (24), is now defined by a hexagonal PYXIS Plane (33), as Cell (34) with the same Attributes (26), on, off, red, blue, hot, cold, 20, 30, 40, etc.

Successive aperture three subdivisions of a general hexagon cell define locations on the PYXIS Plane (33). In an aperture three hexagon subdivision, at any given resolution "n", the area of a general hexagon is 3 times the area of a hexagon one resolution higher, "n+1".

The Plane (33) is infinite in two-dimensional space. As also illustrated on FIG. 2, Cell (34) can also be representative of any single dot or a singular dot within a large group of a Raster Image (35) or Cell (34) could be a point of a Vector Line (28), either located with a PYXIS Index (7277472) (36), which is explained in more detail below, and used as the index to Attribute (26). The area bound by Cell (34) becomes its area of influence.

The division of space on the PYXIS Plane (33), herein coined as the PYXIS innovation, adheres to the following requirements:

Req. 1. Spatial attributes are assigned to a parent cell, whose centroid represents its location and the voronoi region created by the boundary with adjacent parent centroids forming the closed area for which the properties of the cell are represented;

Req. 2. A parent cell for which the centroid location is not a centroid location for any lower resolution cells defines the location of a single new child cell of the next highest resolution; alternatively, Req. 3. A parent cell for which its centroid location is also a centroid location for any lower resolution cells defines the location of a single new child cell of the next highest resolution and multiple new child cells of the next highest resolution, one located at each of the vertices of the parent's boundary edge.

Whereby during initial conditions, a parent cell will be assigned a general hexagon shape or the shape of the plane for which it represents, with a starting centroid location that can be considered the planar origin. A note of interest is that the resulting outline is a figure with properties of the Koch Snowflake curve—amongst others, a infinite perimeter with finite area.

Addressing and Indexing

Figure 4B:
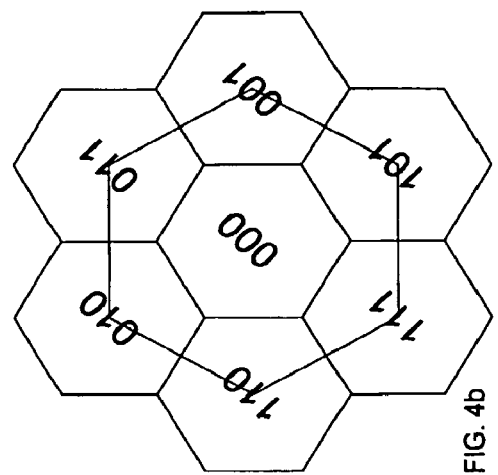
FIGS. 4a, 4b, 4c, 4d, 4e and 4f—EXEMPLORY ORDERING OF THE CHILD CLUSTERED CELLS
Figure 4C:
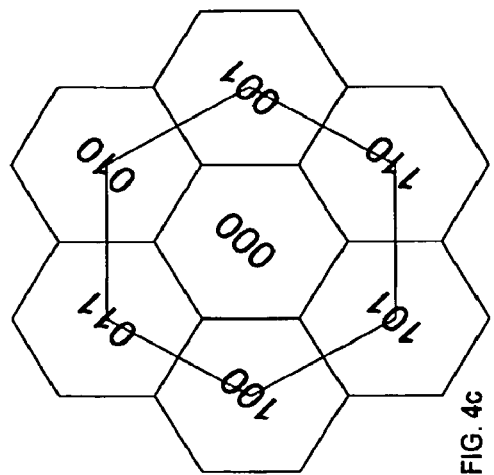
Figure 4A:
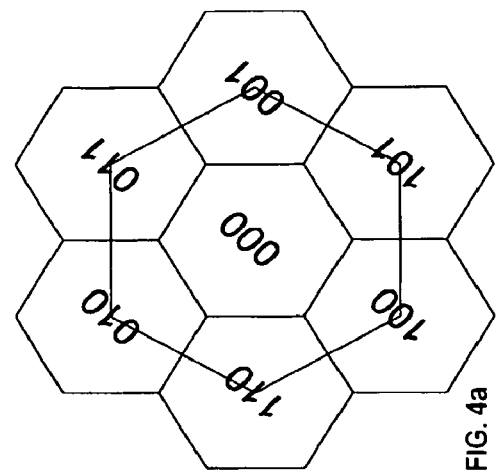
Figure 4D:
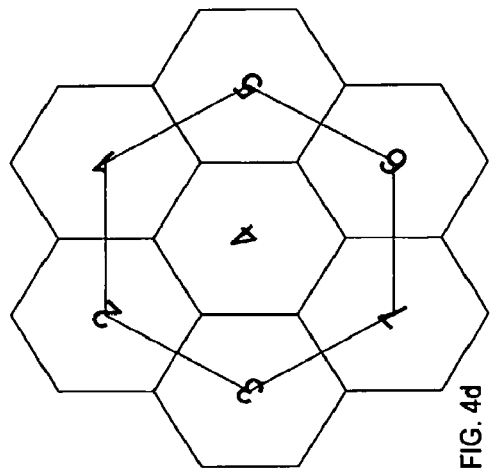
Figure 4E:
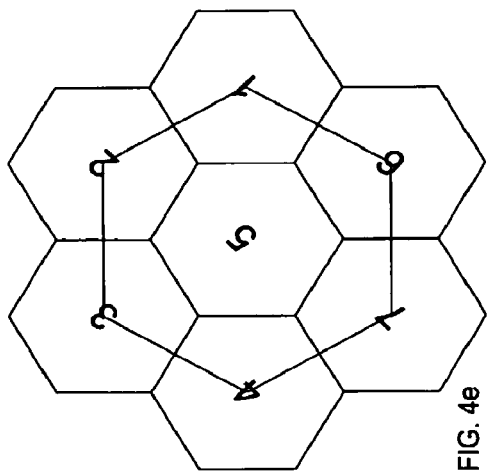
Figure 4F:
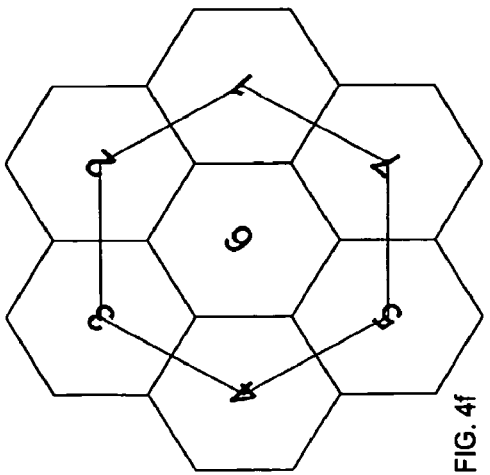

The system or procedure for addressing the cells is based on assigning a number consisting of the cell index of its related parent plus the number corresponding to its order in the cluster of child cells. Ordering of the cluster of child cells can follow simple sequential ordering or other exemplary methods shown: Generalized Balanced Ternary FIG. 4a, Gray Coding FIG. 4b, simple ordering FIG. 4c, various z curves FIGS. 4d, 4e, and 4f and other forms known to those versed in the art such as modifications of Morton, Hilbert, Koch, Peano curves and/or ordering that are not shown.

Child cells at a given resolution (n+1) are uniquely related to a next lower parent cell at resolution (n) if they share the same centroid location or, if the centroid of the child cell is located on the vertex of the cell boundary of a next lower parent cell at resolution (n) whose centroid location is also a centroid location of its parent cell(s) at any lower resolution ($\leq$n−1).

FIGS. 5a to 5f illustrate six successive resolutions of the PYXIS indexing using a simple ordering.

Figure 5C:
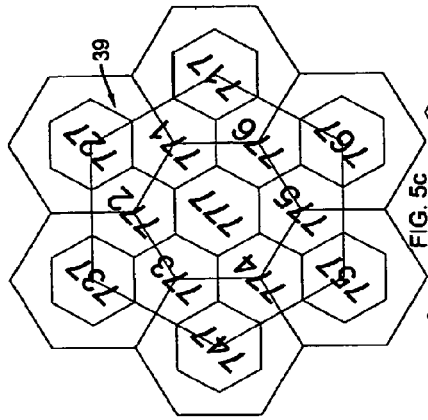
FIGS. 5a, 5b, 5c, 5d, 5e and 5f—SIX SUCCESSIVE RESOLUTIONS OF PYXIS INDEXING USING SIMPLE ORDERING FIGS. 6a and 6b—PYXIS HIERARCHY—illustrates hierarchal views of the PYXIS indexing.
Figure 5F:
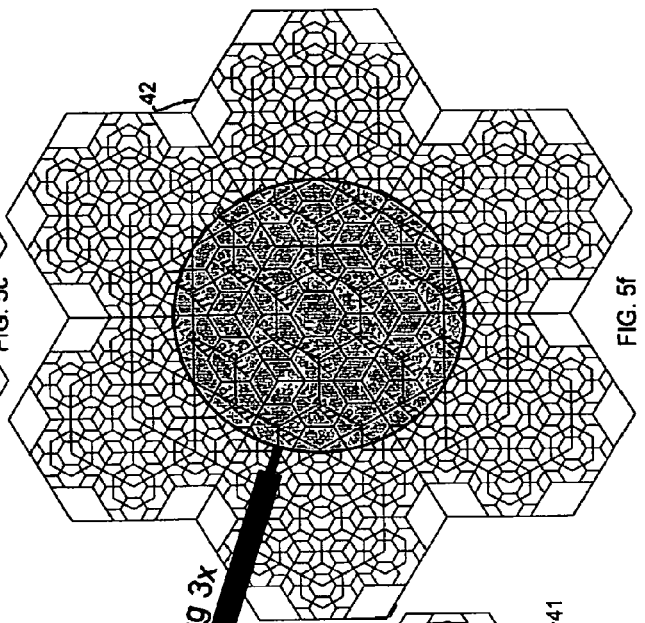
Figure 5B:
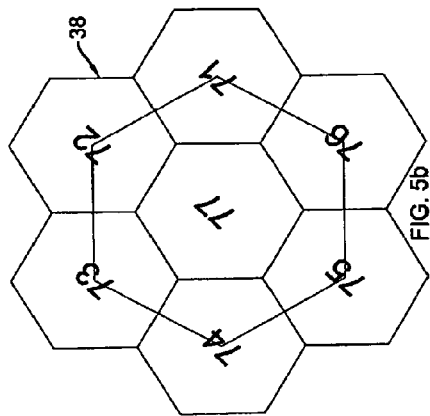
Figure 5E:
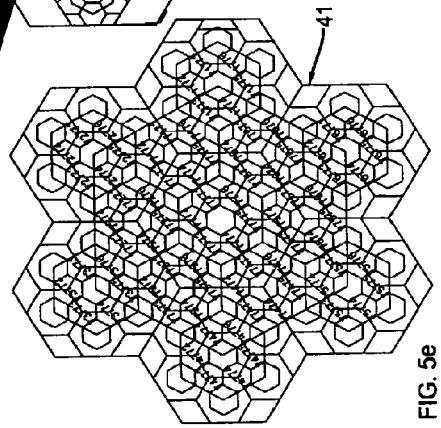
Figure 5A:
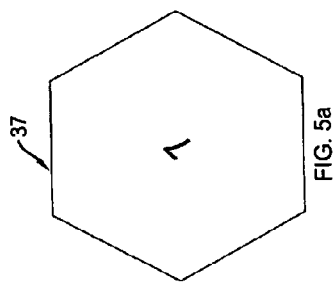

FIG. 5a. A generalized hexagon is set at the origin as an initial condition with a given Resolution (37) and assigned a place value of 7.

FIG. 5b. The second Resolution (38) cell locations exist at all centroids and vertices of Resolution (37) cells, following rule 3, and are indexed with the 7 of the parent and the ordering 1, 2, 3, 4, 5, 6 (of the vertices) and following 7 (at the centroid) resulting in new indices 71, 72, 73, 74, 75, 76 and 77.

FIG. 5c. The third Resolution (39) cell locations follow the same pattern; new cells are given the value of the next lower Resolution (38) parent and a centroid value (7) if they share the same centroid location, rule 2 (71, 72, 73, 74, 75, and 76 and 77 spawn centroid cells 717, 727, 737, 747, 757, and 767), and if the centroid of the new cell is located on the vertex of the cell boundary of a Resolution (38) cell whose centroid location is also a centroid location for a Resolution (37) cell, rule 3, the new cells are given the parent value and an order value (77 spawn vertex cells 771, 772, 773, 774, 775, 776 and 777).

Figure 5D:
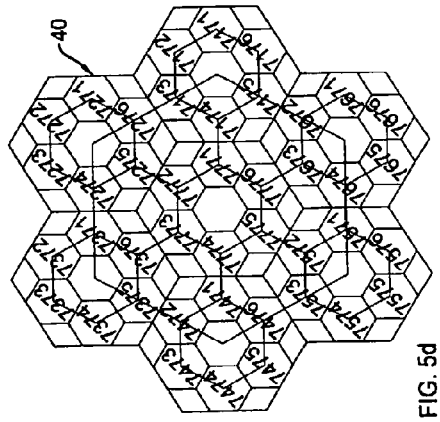

FIG. 5d. The forth Resolution (40) cell division continues similarly, all new cells are given the value of the next lower Resolution (39) index if they share the same centroid location, rule 2 (771, 772, 773, 774, 775, and 776 spawn centroid cells 7717, 7727, 7737, 7747, 7757, and 7767), and if the centroid of a new cell is located on the vertex of the cell boundary of a Resolution (39) cell whose centroid location is also a centroid location for a Resolution (38) cell, rule 3, the new cells are given the parent value and an order value (717, 727, 737, 747, 757, 767 and 777 spawn vertex cells 7171, 7172, 7173, 7174, 7175, 7176, 7177, 7271, 7272, 7273, 7274, 7275, 7276, 7277, 7371, 7372, 7373, 7374, 7375, 7376, 7377, 7471, 7472, 7473, 7474, 7475, 7476, 7477, 7571, 7572, 7573, 7574, 7575, 7576, 7577, 7671, 7672, 7673, 7674, 7675, 7676, 7677, 7771, 7772, 7773, 7774, 7775, 7776, and 7777).

FIG. 5e. This division is continued with successively finer Resolution (41) and

FIG. 5f. Resolution (42).

It should be noted that to facilitate available space, indices for new cells located on centroids used in lower resolutions are not shown on FIGS. 5d, 5e, and 5f.

These unique indices provide for the mapping of two-dimensional spatially organized data in the form of multiple resolutions of closely packed uniformly adjacent cells to a linear index compatible for use in the one-dimensional linear space of a computer memory and/or storage medium, as a conventional file or relational, multidimensional or other similar database system familiar to those versatile in the art. Also, the indexing is so structured as to provide a common addressing scheme for traditional forms of spatial data with an explicit indication of the spatial data location and its area of influence.

As spatial data structures require some flexibility, exceptions to these rules of division and indexing are required. It is straight forward to consider the modification of this system whereas cell shapes and sections of cells on the plane are included or excluded, bent, joined, stretched, rotated, scaled or translated to meet specific spatial requirements such as surface modeling or to create tessellations bounded by specific shapes.

Another flexibility provides for the introduction of one or more new point or cells at a specific resolution that do not fall on a regular PYXIS location for that resolution. PYXIS provides for a cell to be introduced at any unique location and specific resolution. Its ordering precedence superceding its neighbours and its behaviors are considered as a parent cell for which its centroid location is also a centroid location for lower resolution cells. If two or more cells are introduced at any unique location and specific resolution and the boundary of two or three of the new cells share vertices, such vertices define the location of new child cells and the child cells shall be uniquely indexed with reference to its three shared parents, and the behavior of these child cells are considered as a parent cell for which their centroid location is not a centroid location for any lower resolution cells. An example of this and how it is treated is detailed below with the indexing of the first two resolutions of the icosahedron in a discrete global grid system.

Hierarchal Data Structure

Figure 6B:
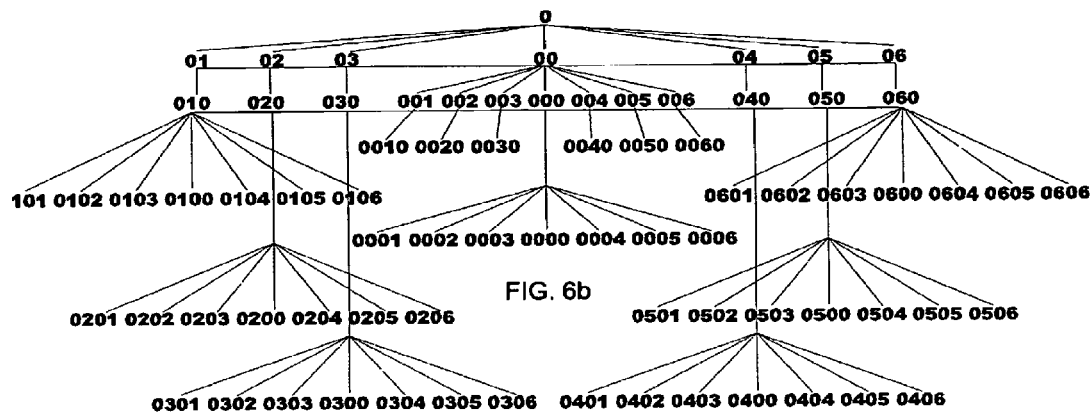
Figure 6A:
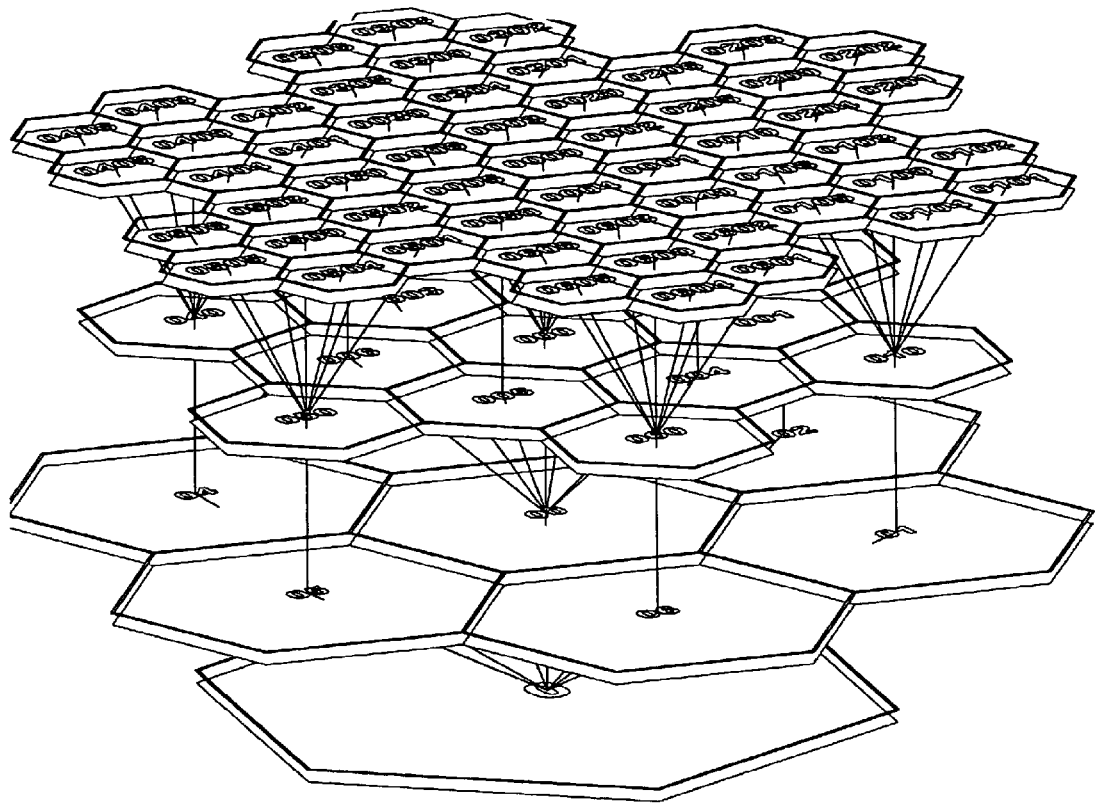

FIGS. 6a and 6b illustrate two additional views of the PYXIS indexing. These figures identify a balanced tree hierarchal data structure. To improve the efficiency and speed of access for the most probable queries the invention takes advantage of the hierarchical structure of the dimensions in spatial data. This hierarchical structure reflects the fact that a typical spatial query asks about members from the same parent in the hierarchy. Thus, the mapping of the present invention provides that records of data with dimension members belonging to the same parent are close to each.

Such data hierarchies in various forms of B-trees and similar data structures are familiar to those versatile in the art of data management. Spatial data hierarchies are the basis for search tree algorithms that allow efficient retrieval of indexed spatial data.

The identification of nearest neighbour cells is key to such spatial searches. FIG. 7 illustrates a procedure to identify nearest neighbour cells on the PYXIS Plane (43). The following tables are used to provide the foundation for tesseral arithmetic used in FIG. 7.

TABLE 1

| PYXIndex Class I Matrix | | | | | | | | | | | | |
|---|---|---|---|---|---|---|---|---|---|---|---|---|
| | 0 | 1 | 2 | 3 | 4 | 5 | 6 | 10 | 20 | 30 | 40 | 50 | 60 |
| 1 | 106 | 3 | 10 | 5 | 50 | 0 | 102 | 2 | 304 | 502 | 104 | 4 |
| 2 | 3 | 205 | 30 | 6 | 0 | 20 | 304 | 204 | 201 | 4 | 1 | 601 |
| 3 | 10 | 30 | 304 | 0 | 1 | 2 | 305 | 205 | 306 | 5 | 106 | 6 |
| 4 | 5 | 6 | 0 | 403 | 40 | 60 | 1 | 601 | 2 | 401 | 502 | 402 |

TABLE 1-continued

PYXIndex Class I Matrix

| 0 | 1 | 2 | 3 | 4 | 5 | 6 | 10 | 20 | 30 | 40 | 50 | 60 |
|---|---|---|---|---|---|---|----|----|----|----|----|----|
| 5 | 50 | 0 | 1 | 40 | 502 | 4 | 106 | 6 | 3 | 506 | 503 | 403 |
| 6 | 0 | 20 | 2 | 60 | 4 | 601 | 3 | 603 | 205 | 403 | 5 | 605 |

TABLE 2

PYXIndex Class II Matrix

| 0 | 1 | 2 | 3 | 4 | 5 | 6 | 10 | 20 | 30 | 40 | 50 | 60 |
|---|---|---|---|---|---|---|----|----|----|----|----|----|
| 1 | 106 | 3 | 30 | 5 | 10 | 0 | 104 | 304 | 102 | 4 | 502 | 2 |
| 2 | 3 | 205 | 20 | 6 | 0 | 60 | 1 | 201 | 304 | 601 | 4 | 204 |
| 3 | 30 | 20 | 304 | 0 | 1 | 2 | 106 | 306 | 305 | 6 | 5 | 205 |
| 4 | 5 | 6 | 0 | 403 | 50 | 40 | 502 | 2 | 1 | 402 | 401 | 601 |
| 5 | 10 | 0 | 1 | 50 | 502 | 4 | 503 | 3 | 106 | 403 | 506 | 6 |
| 6 | 0 | 60 | 2 | 40 | 4 | 601 | 5 | 205 | 3 | 605 | 403 | 603 |

A GBT Gray ordering is exemplary as shown. Addition on Class I (44) and Class II (45) cell rotation represent respective even and odd indexing digits. The procedure requires use of the addition Table (46) whereas the Column Header (47) and Row Header (48) act as the lookup values. The Example (49) illustrates the addition of 6 unit vectors to the index value 0600506 resulting in the nearest neighbour list +1=0600500, +3=0600502, +2=0600050, +6=0600401, +4=0605020 and +5=0600504.

Boolean Operations

Boolean logic plays a central role in spatial data structure algorithms. Boolean algebra is useful for performing operations on the attributes (which may be positional or descriptive) attached to geographic entities in a Geographic Information System. Boolean Logic is especially useful in computing (or modeling) new attributes in topological overlay processing for both vector and raster based systems, as they can be applied to all data types, be they Boolean, Ratio, Interval, Ordinal, or Nominal. A procedure for identifying a PYXIS point as spatially contained, overlapping or excluded, from a specific cell, the spatial data forms of Boolean algebra using the logical operators AND, OR, and NOT are outlined below and references FIG. 8.

In the PYXIS Plane (50), any indexed point can be defined as External To (51), Overlapping (52), or Contained By (53), a Cell (54). Further, the following conditions and procedures apply in their determination:

Condition #1—A point indexed above a lower resolution containment Cell (54) is considered "spatially contained at all resolutions" if its index is nested as a child of the containment Cell (54).

Test Procedure for Containment Condition #1

Given Cell (54) index of resolution n and point index of resolution r, if $n \leq r$ and digits 1 to n of Cell (54) is equal to digits 1 to n of the point index then Condition #1 is True.

Condition #2—A point indexed above a lower resolution Cell (54) is considered "within the spatially overlapping area" if point is found to be "spatially contained at all resolutions" in one of the six neighbour Cells (56) adjacent to the containment Cell's (54) centroid child Cell (55).

Test Procedure for within the Spatial Overlapping Area Condition #2

Given Cell (54) index of resolution n and point index of resolution r, if $n \leq r$ and if digits 1 to n+1 of a neighbour Cell (56) to the centroid child Cell (55) (found using Addition matrix with unit vectors 1 to 6 from Cell (55)), equals digits 1 to n+1 of the point index then Condition #2 is True.

Condition #3—A point indexed above a lower resolution containment Cell (54) is considered "spatially external at all resolutions" if it is not "within the spatially overlapping area" of the containment Cell (54).

Test Procedure for within the Spatial External Area Condition #2

Given Cell (54) index of resolution n and point of resolution r and Condition #1 is False and Condition #2 is False then Condition #3 is True.

Note that, as a PYXIS indexed point on the PYXIS plane (50) explicitly represents an area of influence, a point within the spatially overlapping area (52) may test True under Condition #2 however, it's further determination to be spatially contained, overlapping or external to Cell (54) is dependant on the resolution of the point. The containment Condition #2 is therefore resolution dependant. Condition #2 only determines that the point is within the area of overlapping conditions. To determine if, at the resolution of the point, it is contained, overlapping or external to the Cell (54), further test procedures are required that determine where within the overlapping Cell (56) the point lies.

Within Condition #2, there are two test procedures for cell overlap: Condition #2.1 whereas the overlap Cell (57) is on a vertex and Condition #2.2 whereas an overlap Cell (58) is on a straight boundary edge. The resolution dependant conditions test procedures are detailed below and refer to FIG. 8.

Test Procedure for Point within a Cell Overlapping a Vertex Condition #2.1 or a Cell Edge, Condition #2.2

Given point index of resolution r lies somewhere in overlapping n+1 Cell (56), found at direction d from Cell (55), test for area that contains point.

For i=3 to r:

Condition 2.1:

2.1.1. Point contained in overlapping Area (59) on vertex
Check if point contained in n+i centroid child of Cell (57).
If point containment True, set i=i+1 and loop condition #2.1.1 until n+i Cell index equals point index and therefore "spatially overlapping at this resolution".
If False, goto 2.1.2;

2.1.2. Overlapping Area (60) on edge
Use addition matrix to find cell area (60) defined by resolution n+i overlapping at edge cells (n+i centroid cells of n+i−1 centroid child of Cell (57) d+2 and d−2 neighbours).

If point containment True, set i=i+1 and goto condition #2.2 below.
If False, goto 2.1.3;
2.1.3. Overlap Area (61) where all cells contained within the parent Cell (54)
Use addition matrix to find the 3 resolution n+i contained cells (n+i centroid cell of n+i−1 centroid child of Cell (57) d+3 neighbour AND n+i centroid cells of n+i centroid child of Cell (57) d+4 and d+5 neighbours.).
If point containment True, then point is "spatially contained at all resolutions" of Cell (54), or;
If False, then point is "spatially external at all resolutions" of Cell (54).
Condition 2.2:
2.2.1. Point contained in overlapping Area (60) on cell edge
Check if point contained in n+i centroid child of Cell (58).
If point containment True, set i=i+1 and loop condition #2.2.1 until n+i Cell index equals point index and therefore "spatially overlapping at this resolution".
If False, goto 2.2.2;
2.2.1. Cells (60) overlapping on edge
Use addition matrix to find cell area (60) defined by resolution n+i overlapping at edge cells (n+i centroid cells of n+i−1 centroid child of Cell (57) d+2 and d−1 neighbours or d−2 and d+1 if 2.1.1 met in d−2 addition).
If point containment True, set i=i+1 and goto condition #2.2.1.
If False, goto 2.2.3;
2.2.2. Cells (61) contained within the parent Cell (54)
Use addition matrix to find the 5 resolution n+i contained cells (n+i centroid cells of n+i−1 centroid child of Cell (57) d+3 and d+4 neighbour AND n+i centroid cells of n+i centroid child of Cell (57) d+3, d+4 and d+5 neighbours).
If point containment True, then point is "spatially contained at all resolutions" of Cell (54), or;
If False, then point is "spatially external at all resolutions" of Cell (54).

Spatial Queries

An embodiment of the invention, as demonstrated above, is a method of selecting the spatial data once it resides within the computer device as a hierarchy of indices. Spatial queries on the multiresolutional closely packed PYXIS indexing using standard Boolean procedures familiar to those versatile in the art, provides a means of selecting and sorting spatial features and dimensions of their attributes. Examples of practical forms of these selections include:
Select all features of a given range of resolutions
Select features bound by a given spatial domain (area)
Select features bound by a given polygon shape Select features from 2 disparate sources A and B, that are in A and in B. (Features that exist in both sources)
Select features from 2 disparate sources A and B are in A and those in B that are not in A. (Add to A all features from B not in A)

In addition, a multitude of other possible data queries are possible, based on combinations of resolution, location, cell area, occurrences, attributes, distribution and other dimensions of the data. This core functionality provides the basis for further embodiments detailed below that include data integration, transmission, visual display, analysis, fusion, and modeling.

Geographical Reference

Another preferred embodiment is a system that utilizes the PYXIS indexing to spatially (geospatially) reference (georeference) data located on, around or beneath the surface of earth. Methods of projecting points from the faces of a platonic solid to the earth spheroid as a geodesic reference are well know in various forms of previous art. A method for establishing and referencing multiresolutional closely packed cells on the earth spheroid by projecting the PYXIS plane from an icosahedron is exemplary of the embodiment and used herein to illustrate the capability of the invention, not limiting it to such techniques.

Prior art described by Sahr, et. al. as the Snyder Equal Area Aperture 3 Hexagon Grid (ISEA3H) can be used to orient and generate locations of the closely packed tessellation of the icosahedron to the earth spheroid. The PYIXS innovation provides the linear indexing for such a scheme. FIG. 9*a* shows 5 resolutions of a 3rd aperture hexagon tessellation on a triangular face. These cells are indexed in a manner as described above for linear storage and hierarchal reference. FIG. 9*b* shows an icosahedron solid featuring 12 Vertices and 20 triangular Faces.

Figure 9C:
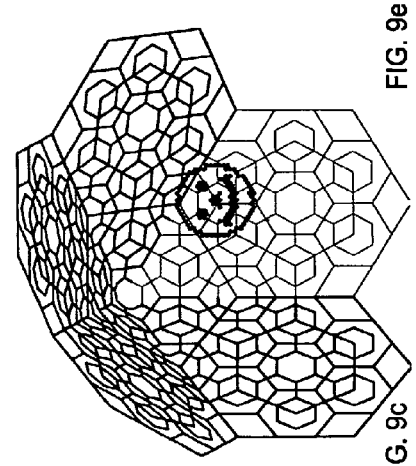
FIG. 9a—PYXIS PLANE ON TRIANGULAR FACE, 9b—PYXIS PLANE ON ICOSAHEDRON, 9c—PENTAGONAL LAYOUT OF PYXIS PLANE, 9d—PYXIS PLANE ON UNFOLDED ICOSAHEDRON and 9e—PYXIS PLANE ON AUTHALIC SPHERE—illustrate an exemplary method for establishing and referencing multi-resolutional close-packed cells on the earth spheroid by projecting the PYXIS plane grid from a geodesic solid, the icosahedron.

Reference to the vertices requires a modification of the PYXIS innovation such that the shape of the original vertex cells and all subsequent cells that are created at this same centroid (always at the icosahedrons vertex) will be a pentagonal as illustrated in FIG. 9*c*. Further, the cells are laid onto the five faces related to each vertex of the icosahedron. The indices are modified accordingly.

Figure 9E:
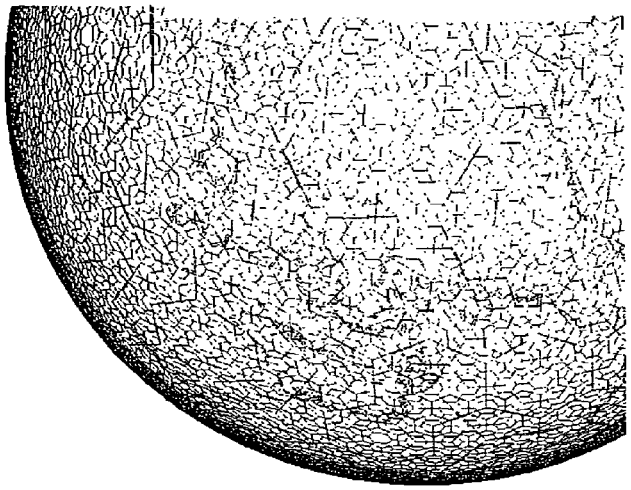
Figure 9B:
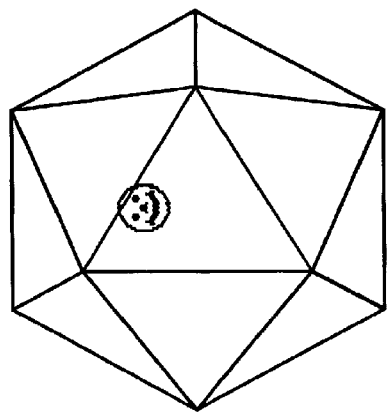
Figure 9A:
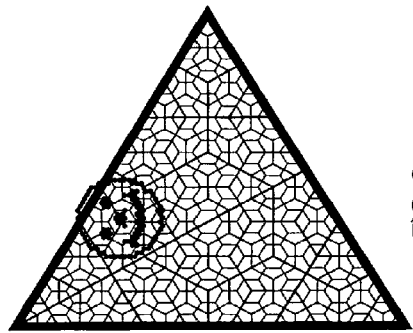
Figure 9D:
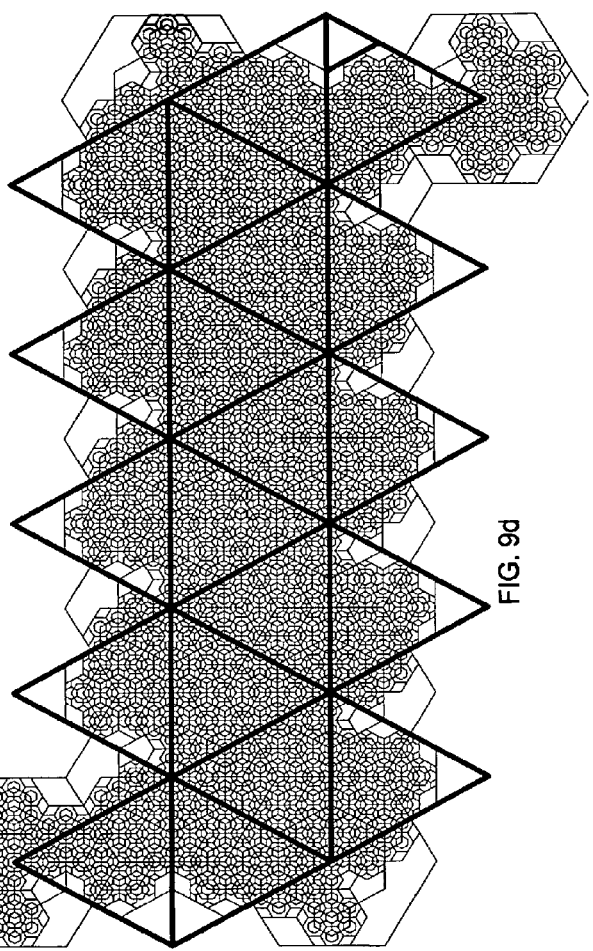

FIG. 9*d* shows 6 resolutions of the modified PYXIS plane oriented on an unfolded (2D) icosahedron suitable for simple transformations. FIG. 9*e* shows this same plane reference projected to a sphere using John Snyder's modified Lambert Azimuthal Equal Area Projection.

In addition to the typical PYXIS tree hierarchy developed above and shown in FIGS. 6*a* and 6*b*, the indexing hierarchy in the georeference to the icosahedron must be modified to include two additional levels, one to index the vertices and a second to index the points on the faces. Exemplary of a simple ordering for these points, but not limited to these labels, would have the vertices labeled 1 through 12 and the faces labeled A to J and Q to Z. This face labels are further referenced to their three parents to provide georeference and order. As an example child cell A is related to parents 1, 3 and 5. Hierarchal precedence is given to the modified cells deemed to be resolution 1 created at the vertex of the icosahedron where the vertices of this modified cell are located at each of the five connected icosahedron faces. Reference at subsequent resolutions returns to the regular PYXIS indices.

In this way, the PYXIS innovation is used to provide a closely packed, uniformly adjacent, multiple resolution, overlapping spatial data discretization and ordering that can be used to georeference the earth spheroid and allow spatial observations of the earth to be transposed from planar space to a one-dimensional space efficient for use in digital computer memory and storage.

A Discrete Global Grid System
System Environment

Figure 10:
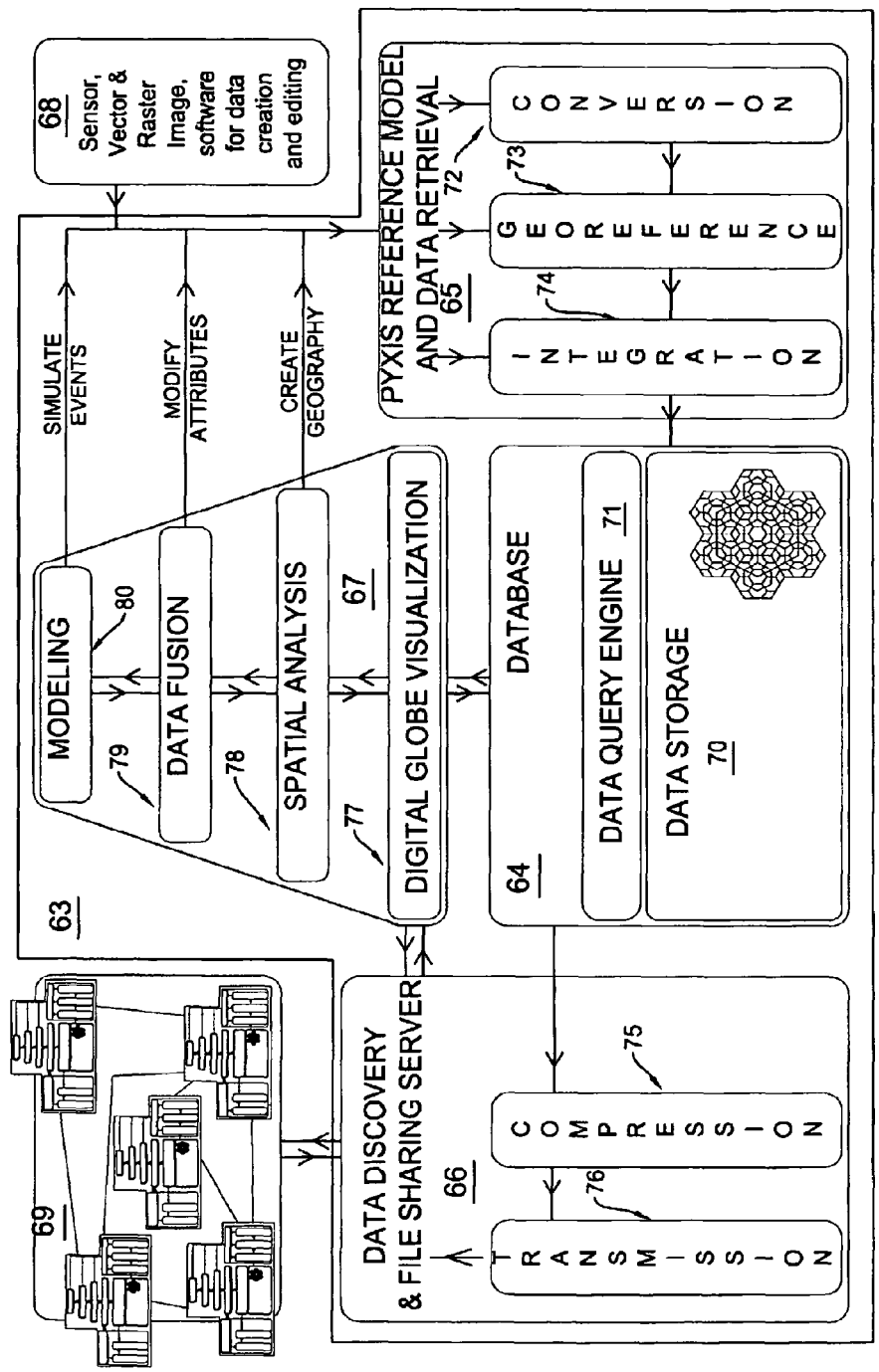
FIG. 10—DISCRETE GLOBAL GRID SYSTEM—an illustration of the components of a Geodesic Discrete Global Grid System.

FIG. 10 illustrates the components of a Discrete Global Grid System (63) as a further embodiment of the invention. The PYXIS innovation provides the combined utility of a closely packed, multiresolutional cell index with a georeference to the earth spheroid that has hierarchical features suitable for storage and selection by structured query. The PYXIS innovation is the basic framework for components of the system: localized and global spatial database (64) (storage (70) and query (71)), retrieval (65) (conversion (72), geo-referencing (73) and integration (74)), data discovery and file sharing (66) (compression (75) and transmission (76)), data transformation systems (67) (visual display (77), analysis (78), fusion (79), and modeling (80)). Creation of imagery and data can be completed by raster and vector image sensors, creators and editors (68) or as a product of the Discrete Global Grid System (63). Peer-to-peer networking of PYXIS data discovery components allow data to be advertised and shared between remote computers (69).

There are many specific methods known within the art of spatial data storage, retrieval, transmission, visual display, integration, fusion, analysis, and modeling suitable for use with the PYXIS innovation. Further, there are other functions that build on the PYXIS innovation not specified. The following is summarily described functionality and it should not be interpreted as encompassing all functional applications of the PYXIS system.

Spatial Data Retrieval

The Spatial Data Retrieval System allows images and data of various formats, sources, types and georeference to be converted to PYXIS geospatial indices, through binning and gridding algorithms, suitable for storage. The critical component to this procedure is the capability to convert a Point (81) with a rectangular coordinate to a cell with a PYXIS index. This can be accomplished by determining the index of the PYXIS cell that contains the point. The point's area of influence provides a basis for assigning a cell resolution.

Figures 11, 12:
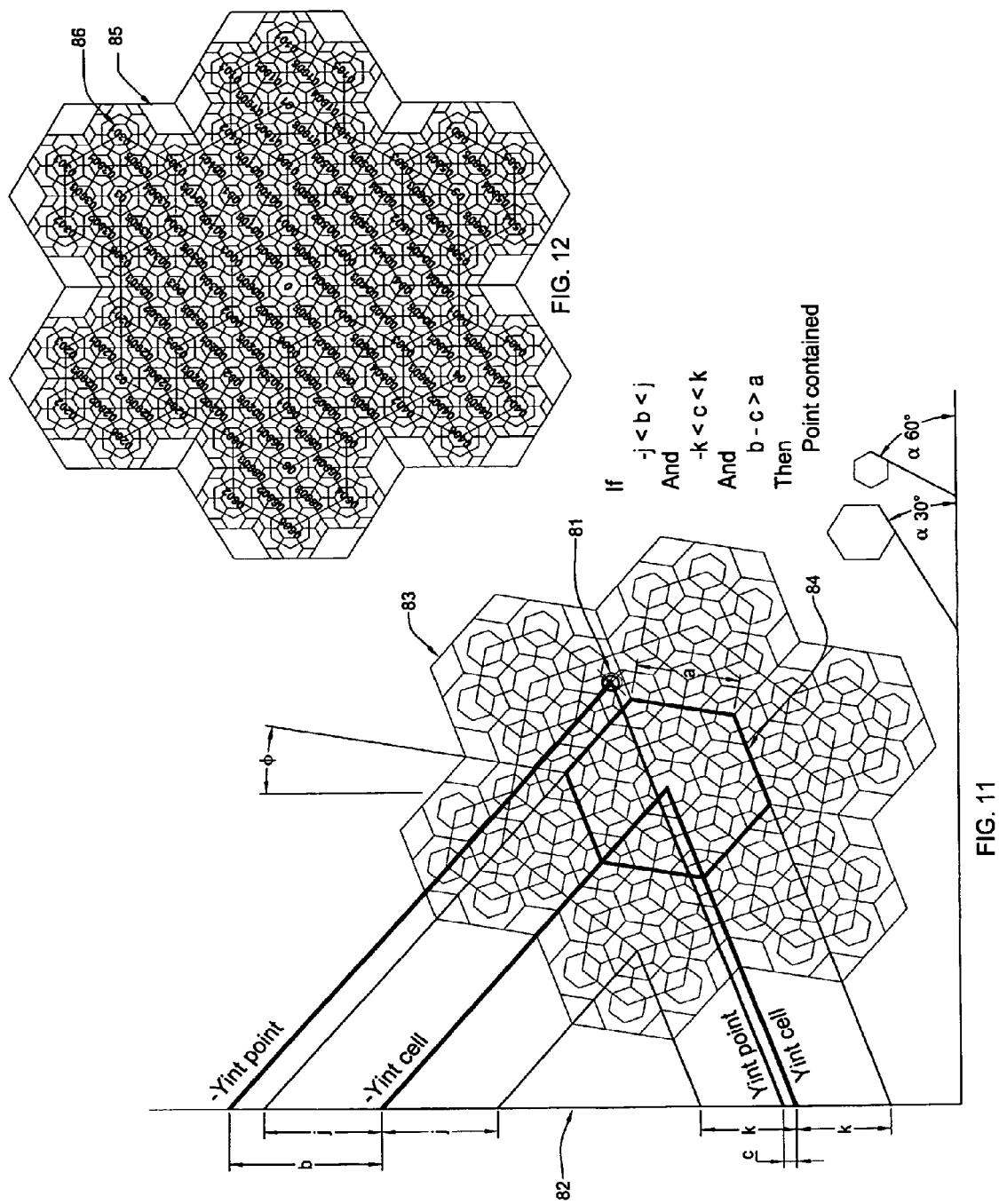
FIG. 11—EXAMPLE OF RECTANGULAR TO PYXIS CONVERSTION—is an illustration of procedure for determining Rectangular Point containment in PYXIS cell.
FIG. 12—AN EXAMPLE OF PYXIS INDEXING—as applied to a given resolution in a multiresolutional tessellations of aperture-3 hexagonal cells.

With reference to FIG. 11, the following steps provide an exemplary method of determining if a rectangular point is contained in a specific PYXIS cell:

1. Align the rectangular Plane (82) with the PYXIS Plane (83) such the rectangular coordinate of at least one cell centroid is known. Let $\phi$ be the angle between the PYXIS Plane (83) and the rectangular Plane (82) and $\alpha$ is 30° for cell resolutions with vertex oriented at the top and 60° for cell resolutions with cell edge oriented at the top of the PYXIS plane.
2. Determine the intercepts of a Y axis with two lines from Point (81), one at an angle $-(\alpha+\phi)$, referred to as $-\text{Yint}_{POINT}$ and the other at $\alpha-\phi$, referred to as $\text{Yint}_{POINT}$.
3. Determine the intercepts of the same Y axis with two lines from the centroid of Cell (84), one at an angle $-(\alpha+\phi)$, referred to as $-\text{Yint}_{CELL}$ and the other at $\alpha-\phi$, referred to as $\text{Yint}_{CELL}$.
4. Where:
   a is the length of one cell side
   b is $-\text{Yint}_{POINT}$ minus $-\text{Yint}_{CELL}$
   c is $\text{Yint}_{POINT}$ minus $\text{Yint}_{CELL}$ $$k=a/\cos(\alpha+\phi)$$

$$j=a/\cos(\alpha-\phi)$$

Then Point (81) is contained in Cell (84) if:

$$-j > b > j \text{ AND } -k > c > k \text{ AND } b-c > a.$$

Note that in the example shown, Point (81) is found not contained in Cell (84).

Data Visualization

Data is indexed and can be stored in a database management system or PYXIS file. As described above, spatial features can be efficiently selected by their spatial relationships, features and dimensions to complete further transformations of the data.

Digital Globe Visualization is an embodiment achieved by transforming selected features from a stored PYXIS index to a rendered object or graphic. Selected feature geometry and attribute values are sent to a rendering pipeline. The application returns to a computer visualization device a representation of the spatially organized data associated with a spatial area and range of resolutions in the form of a whole or partial rendered image of the geodesic globe. The resultant Digital Globe is capable of being rotated, translated, and scaled to produce zoom, pan, yaw, and rotation functions. Exemplary data types eligible for display include PYXIS coded raster images, vector features, map annotations, texture bitmaps and terrain surface and 3 dimensional models.

Geospatial Data Discovery

Another preferred embodiment of the PYXIS Discrete Global Grid System is an Online Spatial Data Discovery and File Sharing Server. With the addition of georeferenced PYXIS index to multidimensional attributed, fielded, and textural or image data, information can be discovered based on its content and geospatial position. Prior art forms using standards and protocols for data exchange and display, like HTML, XML, SOAP, and other web services or peer-to-peer file sharing provide the basis for spatial data publishing and discovery.

Further, the file of data can then be transmitted from the server on demand in its entirety, progressively or continuously. PYXIS code data resides locally and/or remotely and can appear on demand, progressively transmitted or updated continuously over a network environment.

As an example, a schoolteacher, who wants to show her class of students a computer view of the globe, searches, discovers, and then accesses a remote site that serves a vector file of world political boundaries; gained at another server site, she overlays the globe with a recent mosaic of satellite images. Setting resolutions for display, she downloads the image on-demand. The large satellite image is served "progressively", based on the ideal visual resolution and the extent of the view on the computer monitor. As the teacher zooms into a specific area, say downtown Ottawa, the extent of the satellite image is decreased and the resolution increases.

At some point a high-resolution digital ortho photo of Ottawa replaces the lower resolution satellite image. Level Map0 vector file, a 1:100,000 digital topographic map of the world, replaces the boundary file. This type of transmission is suitable as streaming data.

Another form of file transfer, continuous transmission, is helpful when sensor data is used to update a real-time event. While observing a road intersection in downtown Ottawa, a round symbol is changed on the globe from red to green when a traffic signal changes, or a temperature sensor provides for changes in annotation from 22C to 21C.

Another example of a transformation embodiment is the basis for file transmission. A feature of the PYXIS innovation is the compactness of the index. First level compression of a series of indices for transmission is accomplished by noting that cells of different resolutions but in the same area retain the same parent. By ordering the cells in their hierarchy from lowest resolution to highest the parent cell of any index need only be sent once if sent in order. As an example and not limited to this technique, given the following indices:

010203, 010204, 01020401, 01020402, 01020405, 01020500, 01020501, 01020502, 01020503, 010306, 0105

The following digits can be transmitted without losing data where 0 indicates branching back up to the last parent (last 0):

010203, 4, 01, 2, 5, 0, 500, 1, 2, 3, 0, 0, 036, 0, 0, 05

Further compression encoding, whether lossy or lossless, can be performed on PYXIS indices by methods known by those versatile in the art. Further, pre-queried items can serve as a dimension in a spatial OPAP data cube or the data set for a particular CODEC.

Files encoded in this way can be transmitted in their entirety from a server to a client. A PYXIS index attached to a device location, like an IP address, or embedded in a HTML file, or as an XML type tag, provides a geo-reference to the data contained in the file. In this way, the digital representation of such data can be referenced to the earth, providing a spatial abstraction, the globe, as a Spatial Data Browser (or Viewer or Media Player) is an embodiment of the invention. Data stored in PYXIS format are identified in an on-line environment as a search query, displaying at an automated or manually set resolution, a pictographic symbol at the cell location on the Digital Globe. Users can select this symbol with a cursor, activating further software instructions or viewing detailed data.

Or, the parts of the index and attributes may be transferred from a server to a client in response to a query that bounds the area and range or resolutions described above as a query of the PYXIS data. This "progressive transmission" would be activated manually or could be automated based on properties of the clients viewing area. As a user "zooms" from a larger to smaller area, the system returns data further down the resolution of the spatial hierarchy, less area, more detailed.

Or, the data could be continuously transmitted, wherein the client is continuously checking a server for changes to the attributes of a specific cell or group of cells. An example may be an updated RGB colour value from a georeferenced PYXIS indexed video, photometric or satellite image or any other sensor device that includes PYXIS cell reference.

Or, the data can be queried and built as streaming data providing suitable options for real-time applications.

Spatial Data Analysis

An embodiment of the system is Spatial Data Analyzer. Data Analysis Transformations in PYXIS are achieved by Boolean query, performing operations on the attributes (which may be positional or descriptive) to select, build and enhance geography. Spatial analysis with the PYXIS DGGS relies heavily on the geo-synchronization of the gridded data. As an example, using the temporal dimension of census data, a comparison of population of a city in the year 2002 with its population in 1950 is strictly correct if the boundary of the city remained unchanged. Gridded data analysis provides an efficient method of modifying that query to a comparison of the population of a specific set of cells in 2002 to those same cells in 1950. It is thus that PYXIS can perform analysis.

Data Fusion Transformations in PYXIS provide real interpolation of data. The fusion functionality allows the user to select features for 2 or more sources of data, similar to spatial analysis, and then create new attributes through statistical methods known to those versatile in the art of data fusion. Data Integration Transformations, which are similar to data fusion, are achieved by selecting data that are included in a polygon and performing geometric transforms (move, scale, rotate) and superimposition (move data above or below, cut and paste, overlay and mosaicking).

Data Modeling Transformations in PYXIS provides real extrapolation of data. Many studies of dynamic environmental systems can be semi-deterministically modeled with access to current accurate data referenced to a common grid along with formulation of cellular behavior. Modeling methods such as finite difference and cellular automata rely on a defined mesh and or tessellation to frame the calculations.

An embodiment of the invention is a Geospatial Model Building system, which allows the closely packed, uniformly adjacent, multiresolutional, overlapping spatial data ordering to be used as a mesh and grid for the construction of stochastic and deterministic simulation of dynamic earth events. Users can access on-demand in a peer-to-peer environment a multitude of temporal geospatial data at each cell and extract and utilize this spatial data Users can access properties of the grid and the data that references it. Formulas, with constants and variables with spatial and temporal values assigned from PYXIS data. Rules of behavior can be defined which allow extrapolation and predictive modeling, simulating future cell conditions.

As an example, in a PYXIS system, data pertinent to rainfall runoff modeling is discovered, extracted and transmitted from a variety of sources to the model builder including current rainfall conditions, temperature, vegetative cover, soil types, terrain, etc. The user builds formulas using these data fields and other coefficients as variables for calculating water budget, stage, storage and routing conditions. The simulation of a rainfall event results in the increase of simulated water flow over time in a downstream cell, emulating a rainfall/runoff hydrograph.

While the present invention has been described and illustrates herein with reference to the preferred embodiment thereof it will be understood by those skilled in the art that various changes in form and details maybe made therein without departing from the spirit and scope of the invention.

It is to be understood that the embodiments and variations shown and described herein are merely illustrative of the principles of this invention and the various modifications may be implemented by those skilled in the art without departure from the scope and spirit of the invention

The invention claimed is:

1. A computer-implemented method of storing two-dimensional data in system memory, the method comprising:
    a) defining a hierarchical series of tessellations of uniform aperture three hexagonal cells using a processor, each tessellation having a resolution and being stored in the system memory;
    b) mapping one or more attributes from a continuous space to the cells of each tessellation;
    c) assigning each cell in a lowest resolution tessellation a unique index comprising an identifying value;
    d) associating each cell in a given tessellation that is not the lowest resolution with a parent cell contained in the next lower resolution tessellation based on the location of the parent cell relative to a grandparent cell contained in a tessellation of one lower resolution than the parent cell; and
    e) assigning each cell not in the lowest resolution tessellation a unique hierarchical index comprising an index of the parent cell associated therewith and an identifying value.

2. The method of claim 1, wherein the parent cell associated with a particular cell is determined as follows:
    a) if a centroid point of the particular cell is located at a centroid point of a lower resolution cell contained in a tessellation of lower resolution than the tessellation containing the particular cell, the parent cell for the particular cell is the lower resolution cell; and
    b) if a centroid point of the particular cell is located on a vertex point of one or more lower resolution cells contained in a tessellation of lower resolution from the tessellation containing the particular cell, then the parent cell for the particular cell is a lower resolution cell that has a centroid point which is a centroid point of the grandparent cell.

3. The method of claim 1, wherein each parent cell is associated with either only one child cell or seven children cells contained in a tessellation of one higher resolution than the tessellation containing the parent cell, the one child cell having a centroid point that is located at the centroid point of the parent cell and the seven children cells having centroid points located at each vertex and the centroid point of the parent cell.

4. The method of claim 3, wherein the parent cell is associated with the seven children cells when the parent cell has a centroid point which is a centroid point of the grandparent cell.

5. The method of claim 3, wherein the parent cell is associated with the only child cell when the parent cell has a centroid point which is located at a vertex of the grandparent cell.

6. The method of claim 3, wherein the identifiers of six of the seven children cells that have a centroid point located at each vertex have a first common characteristic.

7. The method of claim 3, wherein the identifiers of child cells that have a centroid point located at the centroid point of the parent cell have a second common characteristic.

8. The method of claim 1, further comprising determining an index of at least one adjacent cell to a given cell in the same resolution based on the identifier of the given cell and an addition table.

9. The method of claim 1, further comprising laying the cells of each tessellation onto the faces of an icosahedron and projecting the data from the faces of the icosahedron to a geodesic spheroid.

10. The method of claim 9, wherein a shape, orientation, and projection of the series of hierarchical tessellations conforms to the Icosahedron Snyder Equal Area Aperture 3 Hexagon Grid and the method further comprises:
   dividing the icosahedron surface by introducing one point on each icosahedron vertex, resulting in pentagonal shaped Voronoi regions with shared cell vertices centered on each face of the icosahedron, and then defining a second generation hexagonal cell at each of the shared cell vertices and a second generation pentagonal cell at each icosahedron vertex.

11. A grid system comprising:
   a) a processing unit;
      a system memory storing a hierarchical series of tessellations of uniform aperture three hexagonal cells, each tessellation having a resolution and each cell having a unique index, each cell in a given tessellation that is not the lowest resolution being associated with a parent cell contained in the next lower resolution tessellation based on the location of the parent cell relative to a grandparent cell contained in a tessellation of one lower resolution than the parent cell; and
   b) a system bus operatively coupling the system memory to the processing unit,
   wherein,
      for each cell in a lowest resolution tessellation, the unique index comprises an identifying value,
      for each cell that is not in the lowest resolution tessellation, the unique index comprises an index of the parent cell associated therewith and an identifying value.

12. The system of claim 11, wherein the parent cell associated with a particular cell is determined as follows:
   a) if a centroid point of the particular cell is located at a centroid point of a lower resolution cell contained in a tessellation of lower resolution than the tessellation containing the particular cell, the parent cell for the particular cell is the lower resolution cell; and
   b) if a centroid point of the particular cell is located on a vertex point of one or more lower resolution cells contained in a tessellation of lower resolution from the tessellation containing the particular cell, then the parent cell for the particular cell is a lower resolution cell that has a centroid point which is a centroid point of the grandparent cell.

13. The system of claim 11, wherein each parent cell is associated with either only one child cell or seven children cells contained in a tessellation of one higher resolution than the tessellation containing the parent cell, the one child cell having a centroid point that is located at the centroid point of the parent cell and the seven children cells having centroid points located at each vertex and the centroid point of the parent cell.

14. The system of claim 13, wherein the parent cell is associated with the seven children cells when the parent cell has a centroid point which is a centroid point of the grandparent cell.

15. The system of claim 13, wherein the parent cell is associated with the only child cell when the parent cell has a centroid point which is located at a vertex of the grandparent cell.

16. The system of claim 13, wherein the identifiers of six of the seven children cells that have a centroid point located at each vertex have a first common characteristic.

17. The system of claim 13, wherein the identifiers of child cells that have a centroid point located at the centroid point of the parent cell have a second common characteristic.

18. The system of claim 13, wherein an index of at least one adjacent cell to a given cell in the same resolution is determined based on the identifier of the given cell and an addition table.

19. The system of claim 13, wherein the cells of each tessellation are laid onto the faces of an icosahedron and the data from the faces of the icosahedron is projected to a geodesic spheroid.

20. The system of claim 13, wherein a shape, orientation, and projection of the series of hierarchical tessellations conforms to the Icosahedron Snyder Equal Area Aperture 3 Hexagon Grid and the icosahedron surface is divided by:
   introducing one point on each icosahedron vertex, resulting in pentagonal shaped Voronoi regions with shared cell vertices centered on each face of the icosahedron, and
   defining a second generation hexagonal cell at each of the shared cell vertices and a second generation pentagonal cell at each icosahedron vertex.

* * * * *